Sept. 3, 1963 W. DE BACK 3,102,630
APPARATUS FOR HANDLING ARTICLES
Filed Dec. 14, 1959 4 Sheets-Sheet 4

FIG. 5

INVENTOR
WILLIAM De BACK
BY Hans G. Hoffmeister
ATTORNEY

United States Patent Office 3,102,630
Patented Sept. 3, 1963

3,102,630
APPARATUS FOR HANDLING ARTICLES
William de Back, San Jose, Calif., assignor to FMC Corporation, a corporation of Delaware
Filed Dec. 14, 1959, Ser. No. 859,215
10 Claims. (Cl. 198—78)

The present invention appertains to a method of handling articles and to apparatus for carrying out the method. More particularly, this invention relates to apparatus for handling containers such as cans as they receive a charge of a food product and are thereafter filled with brine or syrup, capped and directed to a processing unit, such as a cooker.

An assembly line or production line procedure is successfully employed in many canneries in the preparation and processing of certain canned food which are essentially fluid in character. Foods having this characteristic, and including juices, pureed foods, soups and sauces, lend themselves best to production line canning processes which may include successive operations of can filling, brining or syruping, can capping, and sterilizing, since foods of this type can be handled as rapidly during the can filling operation as during the other operations, thus enabling the various operations to be accurately timed, synchronized and integrated. However, it has been impossible heretofore to successfully employ a production line canning procedure in the production of such varieties of canned foods as large sections of fruit, whole tomatoes, asparagus spears, and new potatoes which are not fluid in character. It is usually possible to fill cans with these varieties of foods only at a rate which varies from can to can or at a rate which, if it does not vary, is nevertheless far below that at which the other operations of syruping or brining, can capping and sterilizing can profitably be performed. For these reasons it is the general practice of canneries running products of the last mentioned character to fill the same into cans in any convenient manner and to collect on pallets the cans of each variety of product before the cans are further processed. Pallets filled with cans of a single variety of product are then arranged in stacks and are held until a relatively large quantity of that product is accumulated. When a sufficient quantity of one variety of product has been collected to make feasible the coordinated performance of the brining or syruping, can capping and cooking operations in rapid succession in a production line procedure, the cans are fed manually to the syruper. Since, heretofore, there has been no successful way to handle foods of this latter character in a complete production line, the canneries have been faced with higher handling costs and lower production rates than they can afford. Additionally, these foods, while held in the uncapped cans, are unavoidably subjected to unsanitary and harmful conditions.

An object of the present invention, therefore, is to provide an improved apparatus for handling nonfluid food products in a cannery production line.

Another object of the present invention is to provide an improved conveyor system for use in a cannery production line.

Another object is to provide an improved apparatus for accumulating cans in a cannery production line.

Another object is to provide improved means for transferring cans from a conveyor at one level to another conveyor at a different level in a conveyor apparatus of the type mentioned above.

These and other objects and advantages of the present invention will become apparent from the following description and the accompanying drawings, in which.

Figure 1:
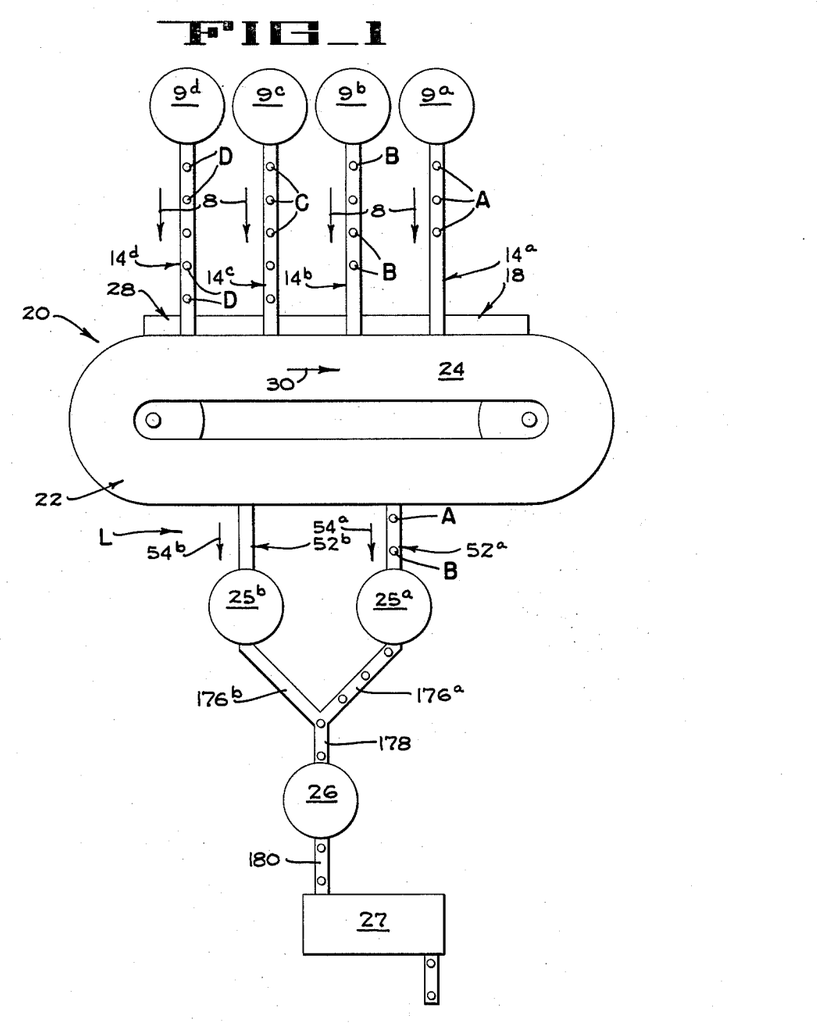
FIG. 1 is a diagrammatic plan of a cannery production line capable of handling nonfluid food products.
Figure 2:
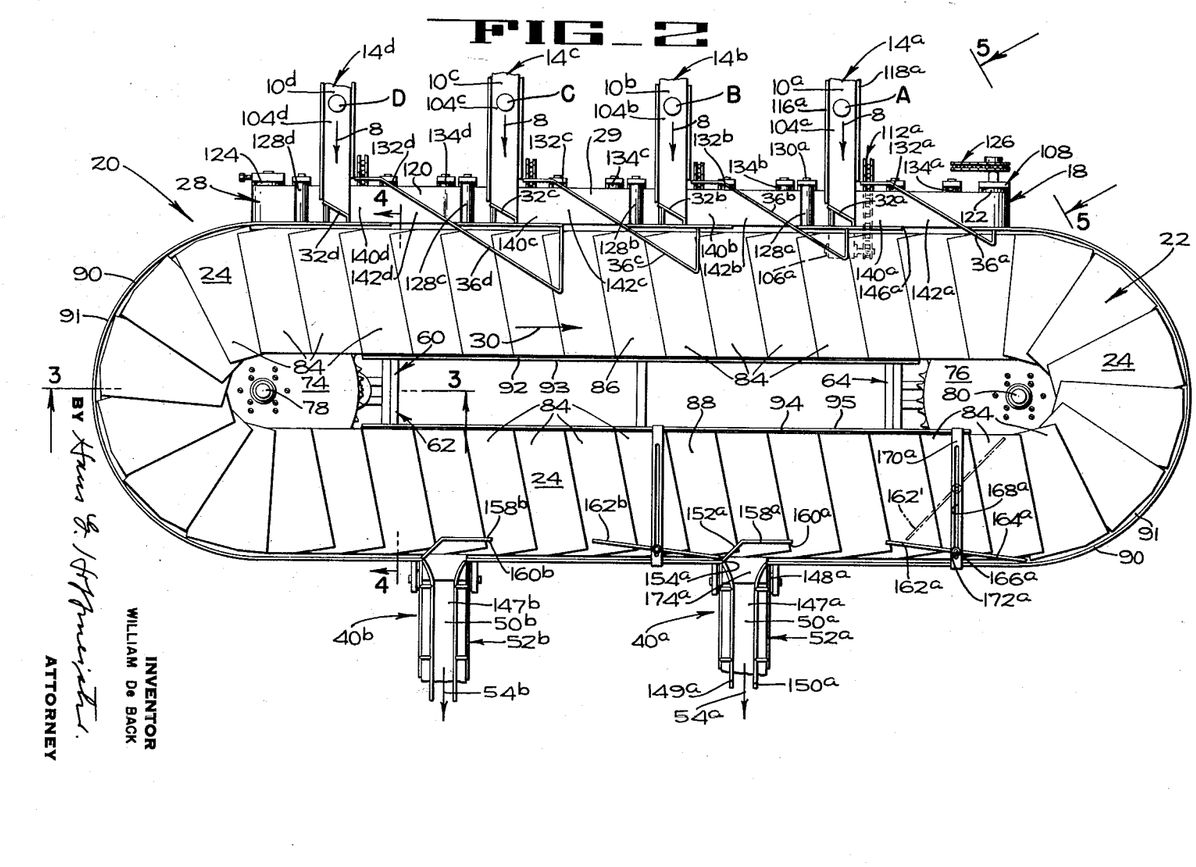
FIG. 2 is a plan of a can accumulator system employed in the production line shown in FIG. 1.

Referring to FIGS. 1 and 2, cans A, B, C, and D in upright position are carried in the directions indicated by the arrows 8 on upper reaches 10a–10d of feed or supply conveyors 14a–14d which transport cans from individual hand-pack stations or filling machines 9a–9d, respectively. For purposes of illustration, it will be assumed that each filling machine has a capacity of 60 cans per minute. The conveyors 14a–14d lead to a can transfer device 18 of a can accumulator system 20 comprising a conveyor 22 having a can carrying surface 24 which defines a closed elliptical path. In the illustrated embodiment of the invention the system 20 is interposed in a cannery production line, indicated in general by the letter L, between the filling machines and two syrupers 25a and 25b, the syruper 25a being arranged to supply heavy syrup and the syruper 25b light syrup to the cans handled thereby. In addition to the filling machines 9a–9d, the accumulator system 20, and the two syrupers 25a and 25b, the production line L includes a can capper 26 followed by a continuous cooker 27. The syrupers 25a and 25b, the can capper 26 and the cooker are capable of and operate most profitably at a predetermined speed considerably higher than that of the filling machines 9a–9d. For instance the syrupers 25a and 25b, capper 26 and cooker 27 can be set to operate satisfactorily at a rate of 200 cans per minute. It is to be understood that the filling machines 9a–9d, the syrupers 25a and 25b, the can capper 26 and the cooker 27 are of well known construction.

Let it be assumed that the cans A and B on the conveyors 14a and 14b have each received a charge of peach halves from their respective filling machines 9a and 9b (FIG. 1) and are each to be filled with a heavy syrup supplied by the syruper 25a. These cans bear like code marks by which the cans containing peach halves in heavy syrup can be identified.

The cans C and D on the conveyors 14c and 14d have each received a charge of peach slices from the filling machines 9c and 9d and are to be filled with a light syrup by the syruper 25b. These cans have like code marks which are different from those on the cans A and B in order that the cans containing peach halves in heavy syrup can easily be distinguished from the cans containing peach slices in light syrup. It will be apparent that the operator is able to select cans containing peach halves or peach slices either by observing the contents of the cans or the code marks.

Figure 5:
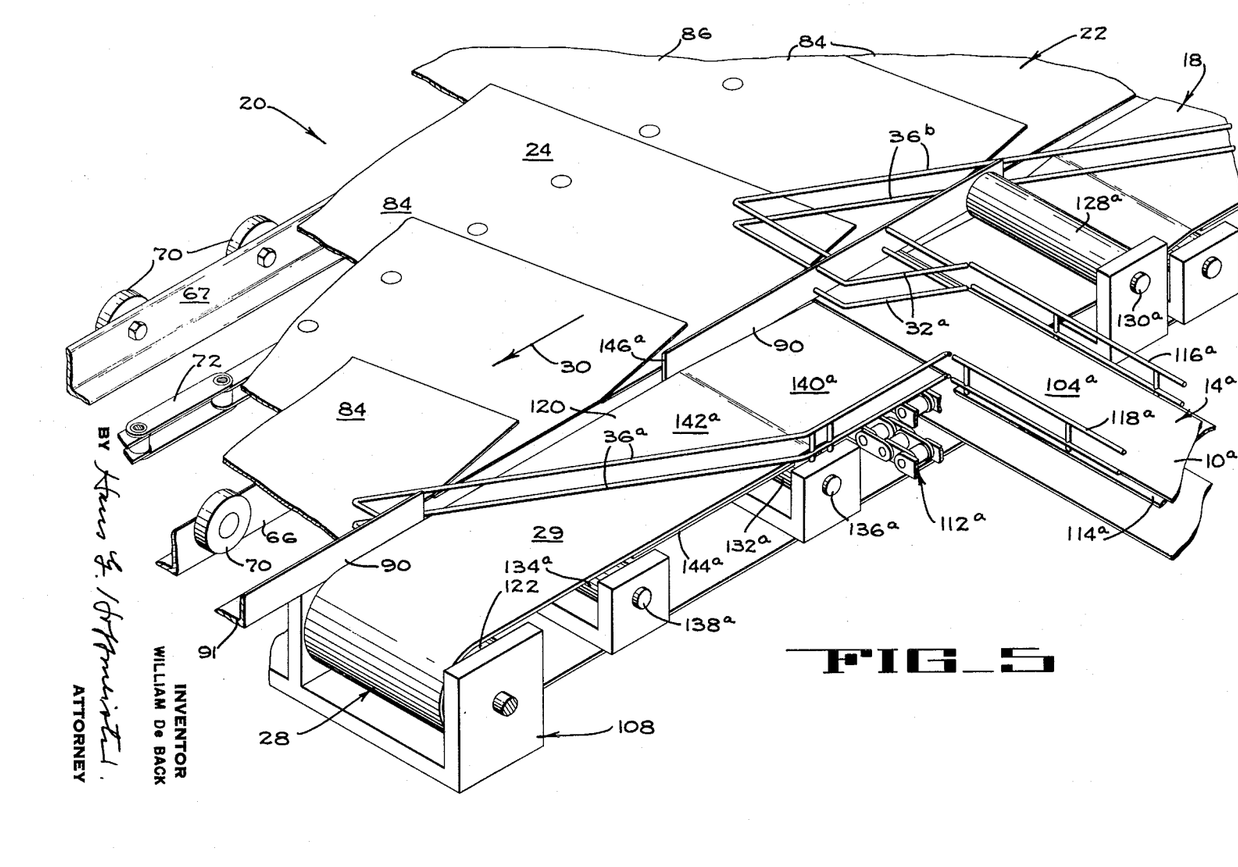
FIG. 5 is an enlarged fragmentary perspective of the can accumulator system of FIG. 2, the view being taken as indicated by the arrows 5—5 of FIG. 2.

The reaches 10a–10d of the conveyors 14a–14d are disposed at a lower level than the can carrying surface 24 (FIG. 5). A conveyor 28 of the can transfer device 18 has an upper reach 29 extending along one side of the can accumulator conveyor 22 and beneath but adjacent to the upper reaches 10a–10d of the conveyors 14a–14d. Both the accumulator conveyor 22 and the transfer conveyor 28 advance in the same direction as indicated by the arrow 30 (FIGS. 1, 2 and 5). The cans A, B, C, and D, moved by the conveyors 14a–14d in the directions indicated, are guided therefrom by deflectors 32a–32d, respectively (FIG. 2), onto the reach 29 which is inclined upward adjacent each of the conveyors 14a–14d from the level thereof to the level of the surface 24. The cans A, B, C and D, upon being raised by the transfer conveyor 28 from the conveyors 14a–14d into planar relation with the surface 24, engage other deflectors 36a–36d associated with the conveyors 14a–14d, respectively. The deflectors 36a–36d guide the advancing cans A, B, C and D from the transfer conveyor 28 and onto the accumulator conveyor 22. The cans, thus elevated from the level of the feed conveyors 14a–14d and transferred onto the accumulator conveyor 22, are carried thereby in a circuit until removed therefrom laterally of the conveyor 22 by an attendant who directs the cans into one or the other of two can discharge devices 40a and 40b included in the accumulator system 20. Since the discharge devices 40a and 40b are similar to each other, the description thereof appearing later herein will be directed particularly to the discharge device 40a. Reference to corresponding parts of the discharge devices 40a and 40b will be made by the use of the same numerals, each having the appropriate suffix letter "a" or "b." The cans entering the discharge devices 40a and 40b are directed thereby from the conveyor 22 and onto the upper reaches 50a and 50b of take-away conveyors 52a and 52b, respectively, moving in the directions indicated by the arrows 54a and 54b associated therewith (FIGS. 1 and 2).

After a supply of cans containing one variety of product, e.g., peach halves in the cans A and B, has been collected on the accumulator system 20 and the cans are passing the discharge devices 40a and 40b at a rate higher than 200 cans per minute, the attendant, located adjacent the discharge devices 40a and 40b, guides these cans into a particular one of the devices, the device 40a for instance. These cans are guided by the device 40a off the conveyor 22 and onto the conveyor 52a which delivers the cans A and B at the rate of 200 cans per minute to the syruper 25a by which these cans are supplied with heavy syrup. It will be apparent that during the time the cans A and B are being routed from the accumulator system to the syruper 25a the number of cans C and D on the accumulator conveyor 22 are increasing. When the supply of cans A and B on the accumulator conveyor 22 has thus been diminished to a point where they can no longer be supplied to their syruper at the rate required by its capacity, the attendant discontinues guiding cans A and B to the discharge device 40a and guides the cans C and D to the discharge device 40b for delivery to the conveyor 52b leading to the syruper 25b by which these cans are filled with light syrup. While the cans C and D are being routed to the syruper 25b, the number of cans A and B on the accumulator conveyor 22 again increases.

Following the syruping operation, cans from both syrupers are routed first to the can capper 26 and then to the cooker 27 which are synchronized with each other and operated at a speed to handle a quantity of cans equal to the output of one syruper, i.e., 200 cans per minute. By first routing a plurality of the cans A and B to the syruper 25a and then routing a plurality of the cans C and D to the syruper 25b, sufficient time is allowed for a plurality of those cans not being routed to a syruper to be fed to and collected upon the accumulator conveyor. It will be apparent that by collecting a plurality of cans of one variety of product and then of another, and routing the cans of one variety to one of the syrupers and then the cans of the other variety to the other syruper, the syrupers will each operate at its capacity even though each syruper is operated only from time to time. Therefore, because of the accumulator system 20 of the present invention, the filling machines 9a–9b, the can capper 26 and the cooker 27 will operate continuously and the entire production line will operate uninterruptedly regardless of the fact that the syrupers will not operate continuously.

The can transfer device 18 and the can discharge devices 40a and 40b are mounted in cooperative relation to the accumulator conveyor 22 upon an elongate, framelike base 60 (FIGS. 2, 3, 4 and 5). The base 60 comprises opposite end support frames 62 (FIG. 3) and 64 (FIG. 2) which are of similar construction. The frames 62 and 64 are rigidly interconnected at each side of the machine by outer and inner pairs of horizontal beams 66 and 67, respectively (FIG. 4), extending longitudinally of the base 60 in transversely spaced relation. The outer beams 66 are interconnected at their corresponding ends by semicircular beam portions 68 (only one shown in FIGS. 3 and 4). Both pairs of longitudinal beams 66 and 67, as well as the end beam portions 68, are provided with a plurality of spaced apart rollers 70 of the same diameter, which are rotatable about horizontal axes. As illustrated best in FIGS. 3, 4, and 5, the peripheries of the rollers 70 project above the beams 66 and 67 and the beam portions 68.

The can accumulator conveyor 22 comprises an endless roller chain 72 (FIGS. 2, 3 and 4) trained around spaced, horizontally aligned sprockets 74 and 76 (FIG. 2) which are journaled on vertical shafts 78 and 80, respectively. The shaft 78 is fixed by bolts 82 (FIG. 3) to the end frame 62 whereas the shaft 80, which is secured to its support frame 64 in a similar manner, is horizontally adjustable longitudinally of the base 60 by means of a slack take-up device of well known construction (not shown) so that the tension on the chain 72 can be varied.

The conveyor 22 includes a series of substantially identical elongate plates 84 (FIG. 2) extending transversely of the chain 72 and disposed in substantially horizontal planar relation. Each plate 84 is fixed along its generally transverse mid portion to one of the chain links in a manner common to conveyors of this type. It will be noted (FIGS. 2 and 5) that the elongate trailing edge portion of each plate 84 overlaps the elongate leading edge portion of the next adjacent trailing plate 84. The plates 84 of conveyor 22, carried by the chain 72, follow the closed elliptical path previously mentioned and provide opposite, parallel reaches 86 and 88.

An upstanding flange 90 (FIG. 3) of an angle member 91 extending about the outer periphery of the can carrying surface 24, and opposite flanges 92 and 94 (FIG. 4) of angle members 93 and 95 extending along the inner edges of the reaches 86 and 88 are supported by the base 60 in a well known manner. The flanges 90, 92 and 94 prevent unwarranted displacement of cans from the accumulator conveyor 22 laterally thereof.

The undersides of the plates 84 adjacent their opposite ends (FIGS. 4 and 5) engage the peripheries of the previously mentioned rollers 70 whereas the end portions of the plates 84 overlie the horizontal legs of the angle members 91, 93 and 95. Thus, the ends of the plates 84 are supported and the rollers 70 aid in supporting, rigidifying and maintaining substantial coplanar alignment of the plates 84 providing the can carrying surface 24 of the conveyor 22.

Figure 3:
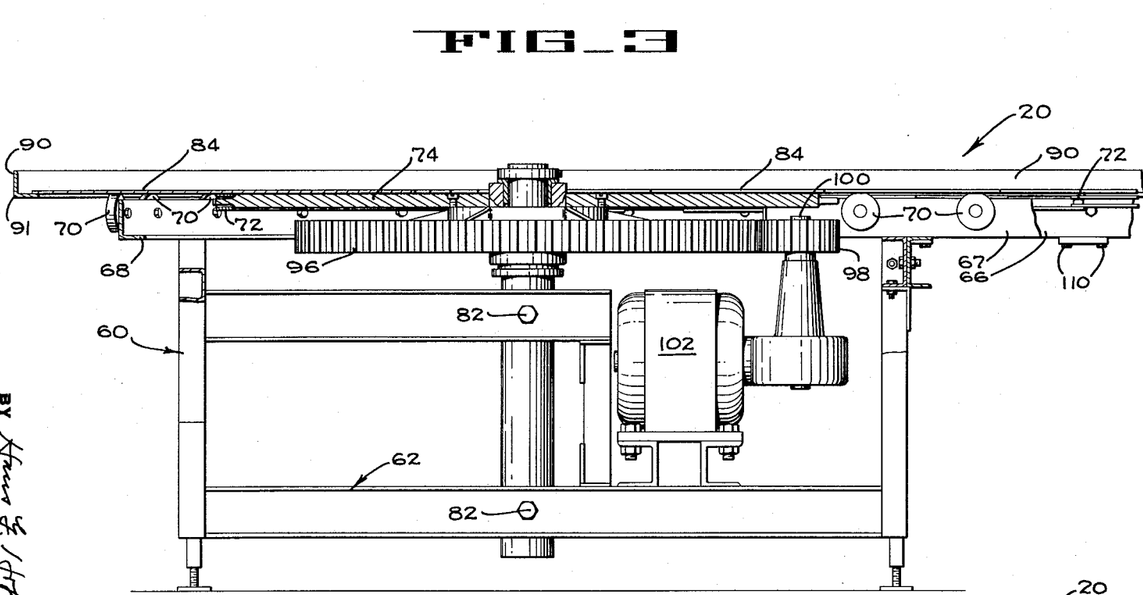
FIG. 3 is an enlarged vertical section taken along lines 3—3 of FIG. 2.
Figure 4:
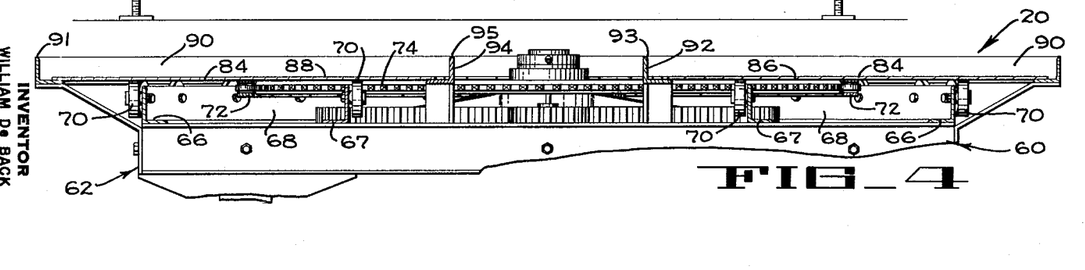
FIG. 4 is an enlarged vertical section taken along lines 4—4 of FIG. 2.

As noted in FIG. 3, a gear 96 which is secured to the sprocket 74 is drivingly engaged by a smaller gear 98 fixed to a drive shaft 100 of a suitable motor 102 to drive the conveyor 22 in the direction indicated by arrow 30 in FIG. 2.

Since the conveyors 14a–14d are similar to each other, the following description will be directed particularly to the conveyor 14a, shown best in FIG. 5. Reference to parts of the conveyors 14b, 14c and 14d corresponding to similar parts of the conveyor 14a will be made by the use of the same numerals which will be accompanied by the appropriate suffix letter *b, c* or *d*. The conveyor 14*a* leads from the filling machine 9*a* toward the accumulator conveyor 22 at substantially a right angle to the reach 86 (FIG. 2). This conveyor has a thin belt 104*a* of suitable width to accommodate cans of various diameters and is trained about an idler pulley (not shown) adjacent the filling machine 9*a* and a drive pulley 106*a* (FIG. 2) disposed beneath the can accumulator conveyor 22. The drive pulley 106*a* is journaled in a part of a transfer device frame structure 108 (FIG. 5) which is attached by bolts 110 (FIG. 3) to the adjacent outer beam 66. A chain and sprocket drive 112*a* (FIGS. 2 and 5) connecting the drive pulley 106*a* to a source of power (not shown) drives the belt 104*a*.

In the region of the can accumulator apparatus 20 the upper reach 10*a* of the conveyor 14*a* is substantially horizontal and is supported in any suitable manner such as by a thin plate 114*a* (FIG. 5) mounted on the frame 108. It is to be particularly noted that the upper reach 10*a* of the belt 104*a* is disposed at a lower level than the can carrying surface 24 and passes therebeneath. Guide rails 116*a* and 118*a* extending along opposite sides of the belt 104*a* are secured to projecting edges of the plate 114*a* and prevent displacement of cans from the conveyor 14*a* laterally thereof.

A belt 120 of the conveyor 28 is similar to the belt 104*a* and is trained about a drive pulley 122 and an adjustable idler pulley 124 (FIG. 2) both of which are journaled in the frame structure 108 for rotation about horizontal axes. The drive pulley 122 is connected to a suitable source of power (not shown) by a chain and sprocket drive 126 so a to advance the belt 120 of the conveyor 28 in the direction mentioned previously. The upper reach 29 of the conveyor 28 extends transversely to and beneath the upper reaches 10*a*–10*d* of the belts 104*a*–104*d* in close laterally spaced relation to the adjacent edge of the accumulator conveyor 22.

Adjacent the right hand side of the conveyor 14*a*, i.e., upstream of the conveyor 28 from the conveyor 14*a* (FIG. 3), there is positioned a horizontal guide roller 128*a* which is journaled on a shaft 130*a* extending transversely of the belt 120. The shaft 130*a* is fixed adjacent its ends to the frame 108 and to the adjacent flange 90 of the angle member 91. The roller 128*a* engages a portion of the reach 29 and holds that portion at a level below the upper reach 10*a* of the supply conveyor 14*a*. Spaced from the other side of the conveyor 14*a*, i.e., downstream of the conveyor 28 from the supply conveyor 14*a*, are two belt supporting guide rollers 132*a* and 134*a* which are of substantially the same diameter. These rollers extend transversely to and are spaced apart longitudinally of the belt 120 and are journaled in horizontal planar relation on shafts 136*a* and 138*a* secured to the frame structure 108. A portion of the reach 29 of the belt 120 extending between the rollers 128*a* and 132*a* is inclined upward, in the direction of belt movement, from the roller 128*a* and is hereinafter called the inclined reach portion 140*a*. This inclined reach portion 140*a* is contiguous with the left hand edge of the belt 104*a* (FIG. 5) in the reach 10*a*. Another portion of the reach 29, extending between the rollers 132*a* and 134*a*, has its upper surface in substantially planar relation with the surface 24 of the accumulator conveyor 22 and is hereinafter called the horizontal reach portion 142*a*. A plate 144*a* extending between the rollers 132*a* and 134*a* is positioned in supporting relation with the reach portion 142*a* and is fixed to the frame structure 108.

Rollers 128, 132 and 134 having the particular suffix letters *b, c* or *d* as the case may be (FIG. 2) and associated with the conveyors 14*b*, 14*c* and 14*d*, respectively, are similar to the corresponding rollers 128*a*, 132*a* and 134*a* associated with the conveyor 14*a* and perform a similar guiding function on the belt 120 with respect to their particular supply conveyors. Thus, the belt 120 is provided with inclined reach portions 140*b*, 140*c* and 140*d* (FIG. 1) and horizonal reach portions 142*b*, 142*c* and 142*d* cooperating therewith.

The previously mentioned deflector 32*a* is fixed to the flange 90 (FIGS. 2 and 5) and extends obliquely across the belt 104*a* in the downstream direction and in spaced relation thereto from a point adjacent the end of the guide rail 116*a*. It will be noted in FIGS. 2 and 5 that the deflector 32*a* extends obliquely downstream with respect to both belts 104*a* and 120 at the location where these belts cross each other. The cans A carried by the belt 104*a*, upon engaging the deflector 32*a*, are guided thereby off the supply belt 104*a* and onto the inclined reach portion 140*a* of the transfer belt 120.

The deflector 36*a* leads from adjacent the end of the guide rail 118*a* and along the edge of the belt 120 remote from the conveyor 22 to a location adjacent the guide roller 132*a*. From this point the deflector 36*a* extends obliquely downstream across the horizontal reach portion 142*a* of the belt 120 and through an opening 146*a* in the flange 90 to a position above the edge of the accumulator conveyor 22. The deflector 36*a* is rigidly secured for support to both the frame 108 and to the flange 90. Cans A carried by the belt 120 and arriving on the horizontal reach portion 142*a* from the inclined portion 140*a* engage the deflector 36*a* and are guided thereby laterally of the belt 120 toward the conveyor 22. Since the adjacent edges of the horizontal reach portion 142*a* and the can carrying surface 24 are in contiguous relation and in substantially planar relation, the cans A moved by the belt 120 against the deflector 36*a* are guided thereby off the transfer conveyor 28, through the opening 146*a* in the flange 90 and onto the surface 24 of the can accumulator conveyor 22.

Cans guided by the deflectors 36*b*, 36*c* and 36*d* are preferably delivered onto the conveyor 22 at locations successively farther inboard thereof with respect to the location to which the cans A are guided by the deflector 36*a*. This is best understood by noting in FIG. 2 that the deflector 36*b* associated with the feed conveyor 14*b* guides the cans B to a location on the conveyor 22 slightly greater than the diameter of a can inboard of the conveyor 22 from the location to which the cans A are guided by the deflector 36*a*. In this way, entry of cans into the conveyor 22 is not obstructed by other cans from any feed conveyor at an upstream location.

The can discharge devices 40*a* and 40*b*, which are located adjacent each other, are spaced from the can transfer device 18 downstream of the can accumulator conveyor 22 (FIG. 2) and comprise the take-away conveyors 52*a* and 52*b* extending at right angles to the conveyor 22 at the outer edge of the reach 88. The conveyor 52*a* includes a belt 147*a* trained about a drive pulley (not shown) adjacent the syruper 25*a* and around an idler pulley 148*a* mounted laterally of conveyor 22 in a manner (not shown) similar to that in which the drive pulley 106*a* of the conveyor 14*a* is mounted. The belt 147*a* is driven in any convenient manner, not shown, such as by a power train from the previously mentioned syruper. Guide rails 149*a* and 150*a*, extending from adjacent the flange 90 along opposite sides of the belt 147*a*, are adjustable laterally of the belt and prevent unwarranted movement of cans from the conveyor 52*a* laterally thereof.

A fixed deflector 152*a* of the discharge device 40*a* is secured to the flange 90 downstream of an opening 154*a* therein leading from the accumulator conveyor 22 to the take-away conveyor 52*a*. The fixed deflector 152*a* projects obliquely upstream of the conveyor 22 from the flange 90. The deflector 152*a* has an elongate leg 158*a* projecting from its inner end longitudinally upstream of the conveyor 22. The leg 158*a* functions as a fence and is disposed in parallel spaced relation to the flange 90. The space thus provided between the fence 158*a* and the adjacent portion of the flange 90, or edge of the conveyor 22, provides the discharge apparatus 40*a* with a mouth 160a of slightly greater width than the diameter of a can to retain cans therein in single file relation longitudinally of the conveyor 22.

A diverter 162a of the discharge device 40a is located upstream from fence 158a and comprises an elongate, rigid strap 164a having a stem 166a at its center which projects at right angles to the strap from its upper edge. The stem 166a is received in an elongate slot 168a of a horizontal bridge bar 170a which extends transversely of the conveyor 22 in spaced relation above the reach 88 and is rigidly connected in any convenient manner (not shown) to the base 60. The stem 166a is attached to the bridge bar 170a by nuts 172a (only one shown, FIG. 2) so as to permit the diverter 162a to be adjusted angularly as well as transversely of the conveyor 22. As shown in full lines in FIG. 2, the diverter 162a has one end located adjacent the flange 90 and extends obliquely downstream therefrom inward of the conveyor 22. The inner end of the diverter 162a is substantially aligned longitudinally of the conveyor 22 with and is spaced some distance from the distal end of the fence 158a. The distance between the diverter 162a and the adjacent end of the fence 158a is great enough to permit a plurality of cans in a single file of four or five cans, arranged longitudinally of the conveyor 22, to be moved laterally therebetween.

Any cans, such as the cans A carried on the conveyor 22 adjacent the flange 90, engage the diverter 162a and are directed thereby inwardly of the conveyor 22 beyond the fence 158a. It will, therefore, be apparent that it is impossible for any cans to enter either the discharge device 40a or the discharge device 40b unless the cans are moved by the attendant laterally of the conveyor 22 and into alignment longitudinally thereof with the mouth 160a or 160b as the case may be. Cans, which are moved, for instance, into alignment with the mouth 160a of the discharge device 40a, are carried by the conveyor 22 against the deflector 152a and are routed or guided thereby to and through the opening 154a to the take-away conveyor 52a. The cans in the discharge device 40a, as they leave the accumulator conveyor 22, move across a bridge plate 174a onto the belt 147a for movement along the take-away conveyor 52a to the previously mentioned syruper 25a.

In describing the operation of the can accumulator apparatus 20 of the present invention as it functions in the assembly line L, only the transfer of the cans A from the feed conveyor 14a to the accumulator conveyor 22 will be described, it being understood that all of the cans A, B, C and D are similarly transferred thereto from their particular feed conveyor.

With the various filling machines 9a–9d and the conveyors 14a–14d, 22 and 28 of the can accumulator apparatus 20 in operation, the cans A advancing at the rate of 60 cans per minute on the supply conveyor 14a are carried thereby against the deflector 32a (FIGS. 2 and 5). The deflector 32a guides the cans A laterally off the belt 104a in the general direction in which the transfer and accumulator conveyors 28 and 22 are advancing. The upwardly inclined reach portion 140a of the transfer belt 120 defines a relatively shallow angle with respect to the belt 104a so as to pass very close thereto or in touching relation therewith beneath the left hand edge of the reach 10a (FIG. 5). The relationship of the inclined reach portion 140a to the reach 10a is such that the cans are inclined only to a minor extent as they move onto the belt 120 from the belt 104a. Because the belt 104a is thin, the inclined reach portion 140a comprises a substantially uninterrupted continuation of the reach 10a. For this reason the trailing portion of the can, moving from the reach 10a onto the belt 120, experiences almost no drop or sudden downward movement. The narrow space over which the cans must pass while moving from the belt 104a onto the belt 120 does not adversely effect the smooth advance of the cans. For these reasons, the cans A remain relatively steady while being transferred from the belt 104a of the supply conveyor 14a to the belt 120 of the transfer conveyor 28 since they are not subjected to conditions which would cause them to sway or tip. The cans A which have been thus transferred to the conveyor 28 are raised by the inclined reach portion 140a of the advancing belt 120 from the level of the supply conveyor 14a to the elevated, horizontal reach portion 142a at the level of the can carrying surface 24 of the accumulator conveyor 22.

Continued advance of the cans A on the horizontal reach portion 142a brings them into engagement with the deflector 36a which guides the cans smoothly off the transfer conveyor 28 and onto the can carrying surface 24 of the can accumulator conveyor 22. Here also, the cans remain steady while being transferred from the belt 120 of the conveyor 28 to the can carrying surface 24 of the accumulator conveyor 22 since the can carrying surfaces thereof in this region provide a substantially uninterrupted surface. The conveyor 22 continues to advance the cans A along the deflector 36a beyond the inner end thereof. The cans A, upon disengagement from the inner end of the deflector 36a, are carried by the conveyor 22 toward the discharge devices 40a and 40b. The cans B, C and D are similarly transferred from their particular supply conveyor 14b, 14c or 14d onto the accumulator conveyor 22. It will be understood that prior to starting of the conveyors 52a and 52b and before the attendant directs cans from the conveyor 22 to the discharge devices 40a and 40b, the cans A, B, C and D are permitted to collect on the accumulator conveyor 22 for a predetermined time.

When a plurality of cans, in the order of several hundred to a thousand or more depending upon the diameter of the cans and the width and length of the conveyor 22, have collected on the accumulator conveyor 22, the conveyors 52a and 52b and the other machines of the production line, i.e., the syrupers 25a and 25b, the can capper 26 and the cooker 27 are set in operation. It will be apparent that, when a plurality of cans in the order of the number mentioned have collected on the accumulator, the cans of each variety of product will pass a given point, such as one of the discharge devices, at a rate in excess of the 200 can per minute capacity at which the individual syrupers 25a and 25b operate. The attendant, standing adjacent the discharge devices, then selects cans A and B containing peach halves and directs them between the adjacent ends of the fence 158b and the diverter 162a into the discharge device 40a for movement onto the belt 147a. This belt operates at a suitable speed to adequately supply the associated syruper with cans and it is the attendant's task to route the cans A and B to the discharge device 40a from the conveyor 22 at a rate of 200 cans per minute. When the cans A and B on the conveyor 22 have been diminished in qauntity to a number which no longer permits supplying these cans to the syruper 25a at a suitable rate to continue its operation at capacity, the attendant discontinues routing the cans A and B to the discharge device 40a. Conveyors 176a and 176b (FIG. 1) leading from the syrupers 25a and 25b, respectively, converge adjacent the capper 26 and discharge into a single conveyor 178 for supplying cans to the capper 26. A conveyor 180 leading from the capper 26 advances cans therefrom to the cooker 27. It will be understood that these conveyors are suitably driven, by means not shown, to advance cans at the rate of 200 per minute.

Upon discontinuing the routing of cans A and B to the discharge device 40a the attendant selects cans C and D containing peach slices and directs them into the space between the fence 158b and the diverter 162b to be directed into the discharge device 40b for routing to the other syruper 25b. It will be understood that the belt 147b operates at a suitable speed to adequately supply the syruper 25b with cans as described in connection with the conveyor belt 147a. While the attendant is removing the cans C and D from the accumulator conveyor 22, thus constantly reducing the number of cans C and D thereon, the number of cans A and B in the accumulator system 20 is constantly increasing. When the number of cans C and D on the accumulator conveyor 22 has been reduced as described in connection with the cans A and B, the directing of cans C and D to the discharge device 40b is discontinued. Thereafter, the procedure of directing cans A and B to the discharge device 40a is resumed while the number of cans C and D increase. It will be apparent that the operation of first directing a plurality of cans of one variety of product, such as contained in the cans A and B, and then a plurality of cans of another variety of product, such as contained in the cans C and D, to their particular discharge device and syruper is continued for the duration of the canning operation. For this reason the syrupers 25a and 25b operate alternately, each syruper operating at a capacity rate to fill cans even though it does not perform this operation continuously. Thus, the supply of cans fed to the capper 26 and to the cooker 27 is uninterrupted. Therefore, because of the accumulator apparatus 20, it is possible to use a complete production line procedure in the canning and processing of nonfluid foods characterized by large sections of fruit, whole tomatoes, asparagus spears and new potatoes. After passing through the cooker 27, the cans having the different varieties of products which are easily identified by the different code marks are sorted from each other so that the cans containing the peach halves and peach slices can be correctly labeled and separately cased in a well known manner.

It has been found that under certain conditions, such as when cans containing a single variety of nonfluid-food which are supplied at a somewhat lower rate than 60 cans per minute by each of the filling machines 9a–9d are to receive brine or syrup of the same composition, a single discharge device 40a can be employed to route cans to the syruper 25a only. In such a case the diverter 162a is used in the alternative position shown in phantom at 162′ (FIG. 2). In this instance the diverter 162′ has one end located adjacent the inner edge of the accumulator reach 88. The diverter 162′ extends obliquely downstream crosswise of the conveyor 22 and has its other end disposed in substantially the same relation with the fences 158a as previously described in connection with the diverter 162a. The cans carried by the conveyor 22 engage and are directed by the diverter 162′ into alignment with the mouth 160a. Cans entering the mouth 160a are removed from the accumulator conveyor 22 by the discharge device 40a at a rate determined by the conveyor 52a. Cans in excess of those removed by the conveyor 52a and carried by the conveyor 22 toward the mouth 160a and deflected inwardly of the conveyor 22 by engagement of these cans with the relatively stationary cans entering the mouth 160a. The cans thus deflected inwardly of the conveyor 22 pass the discharge device 40a and are carried in a circuit by the accumulator conveyor 22 back to the diverter 162′. In this way the accumulator system 20, employing the diverter 162′ shown in phantom, operates to supply cans at a rate required by the syruper 25a, the capper 26 and the cooker 27 in the production line L yet compensates for the slowness of the individual filling machines and any momentary fluctuations occurring in the flow of cans delivered by the filling machines.

The can accumulator system 20 of the present invention functions efficiently in a production line to accumulate a plurality of cans of several varieties of food which have been filled into their cans by a plurality of filling machines, each operating at a rate below that required by the other machines of the production line. The cans are supplied by the accumulator system 20 in a manner to maintain a flow of cans at a rate permitting the canning operations to be performed in an uninterrupted production line procedure. Additionally, the can accumulator system 20 operates to transfer cans from a conveyor at one level to another conveyor at a different level smoothly and without causing the cans to sway or tip.

While a particular embodiment of the present invention has been shown and described, it will be understood that the method and apparatus of the present invention are capable of modification without departing from the principles of the invention and that the scope of the invention should be limited only by the scope and proper interpretation of the claims appended hereto.

The invention having thus been described, what is believed to be new and desired to be protected by Letters Patent is:

1. In an article handling apparatus, an accumulator conveyor arranged to carry articles along a closed path, an article supply conveyor at a height different from that of said accumulator conveyor, a transfer conveyor extending transversely of said supply conveyor and having an inclined portion extending from adjacent and beneath said supply conveyor into planar relation with the article carrying surface of said accumulator conveyor with the adjacent edges of said accumulator conveyor and said transfer conveyor in contiguous relation, a first deflector above said supply conveyor and extending obliquely downstream with respect to said supply and said transfer conveyors to direct articles off the supply conveyor and onto the transfer conveyor, and a second deflector extending obliquely downstream across said transfer conveyor toward said accumulator conveyor to direct articles off the former and onto the latter, said transfer conveyor being arranged to advance articles into contact with said second deflector and force them laterally over said contiguous edges onto said accumulator conveyor.

2. In an article transfer apparatus, a first article carrying conveyor, a second article carrying conveyor extending at an angle to and beneath said first conveyor, first support means for said second conveyor mounted upstream thereof from said first conveyor and disposed at a lower elevation than said first conveyor and in engagement with a portion of said second conveyor to hold the same at said lower elevation, second support means for said second conveyor mounted downstream from said first conveyor and at a greater height than said first conveyor and engaging a portion of said second conveyor to support the same at a greater height than said first conveyor, the portion of the second conveyor extending between said first and said second support means being disposed in inclined relation to said first conveyor and in contiguous relation to one edge of the same, and a fixed deflector located where said conveyors cross each other and in article engaging relation above said first conveyor, and said deflector extending obliquely across the same in a downstream direction with respect to both conveyors to direct articles laterally over said one edge of the first conveyor and onto the contiguous portion of said second conveyor.

3. The article transfer apparatus according to claim 2 and including a third support means for said second conveyor downstream thereof in spaced relation to said second guide means, said third support means being mounted at substantially the same height as said second support means in engagement with a portion of the second conveyor to cooperate with said second support means in supporting the portion of the second conveyor extending between said second and third support means in planar relation to provide the second conveyor with a horizontal portion.

4. The article transfer apparatus according to claim 3 and including a third article carrying conveyor having a portion in planar relation with said horizontal portion of said second conveyor, one edge of said horizontal portion and an edge portion of said third conveyor being in contiguous relation, and a second fixed deflector in article engaging relation above said horizontal portion and extending obliquely across said second conveyor in a downstream direction toward said third conveyor to direct articles off the former and onto the latter.

5. In an article transfer apparatus, a first article carrying conveyor, an article supply conveyor at a height below that of said first conveyor, a transfer conveyor extending transversely to and beneath the supply conveyor and having an edge portion in adjacent substantially parallel planar relation to an edge portion of said first conveyor, first support means for said transfer conveyor upstream thereof from said supply conveyor and having a conveyor contacting surface at an elevation lower than the elevation of said supply conveyor to hold the portion of said transfer conveyor in contact therewith at said lower elevation, second support means downstream of said supply conveyor and at an elevation above the same and supporting an elongate horizontal portion of said transfer conveyor in contiguous planar relation with said first conveyor, the portion of the transfer conveyor extending between said first and said second support means being contiguous with one edge of said supply conveyor and in inclined relation to the same, a first deflector extending obliquely downstream with respect to said supply and transfer conveyors to dircet articles off said supply conveyor and onto said transfer conveyor over the contiguous portions of said conveyors, and a second deflector extending obliquely downstream of said transfer conveyor across said horizontal portion toward said first conveyor to intercept articles being advanced by said transfer conveyor and guide them laterally over the planar edge of said first conveyor and said transfer conveyor and onto said first conveyor incident to continued movement of said transfer conveyor.

6. In an article accumulating system, an endless article accumulator conveyor arranged to carry articles along a closed path, an article supply conveyor at a lower level than said accumulator conveyor, a transfer conveyor extending transversely to and beneath the supply conveyor and having an edge portion in substantially parallel relation to an edge portion of said accumulator conveyor, first guide means for said transfer conveyor upstream from said supply conveyor and disposed therebelow and in engagement with a portion of said transfer conveyor to hold the same against upward movement, second guide means downstream of said transfer conveyor in spaced relation to said supply conveyor and at a greater height than the same and supporting an elongate portion of said transfer conveyor to provide the same with a horizontal portion in planar relation with said accumulator conveyor, the portion of said transfer conveyor extending between said first and said second guide means being contiguous with one edge of said supply conveyor and in inclined relation to the same, a first deflector extending obliquely downstream with respect to said supply and transfer conveyors to direct articles off said supply conveyor and onto said transfer conveyor, a second deflector extending obliquely downstream of said transfer conveyor across said horizontal portion toward said accumulator conveyor to direct articles off the former and onto the latter, a third deflector downstream of said accumulator conveyor from said second deflector and extending obliquely upstream from adjacent one edge of said accumulator conveyor for guiding articles off the same, and a diverter extending obliquely downstream over said accumulator conveyor from a position adjacent one edge of the same to a point spaced from said position, the downstream end of said diverter being spaced upstream from said third deflector to permit an article to pass between the adjacent ends of said third deflector and said diverter.

7. In an article handling apparatus, an endless article accumulator conveyor arranged to carry articles along a closed path, an article supply conveyor at a lower level than said accumulator conveyor, a transfer conveyor extending transversely to and beneath the supply conveyor and having an edge portion in substantially parallel relation to an edge portion of said accumulator conveyor, first guide means for said transfer conveyor upstream thereof from said supply conveyor and disposed therebelow in engagement with a portion of said transfer conveyor to hold the same against upward movement, second guide means downstream of said transfer conveyor in spaced relation to said supply conveyor and at a greater height than the same and supporting an elongate portion of said transfer conveyor to provide the same with a horizontal portion in planar relation with said accumulator conveyor, the portion of said transfer conveyor extending between said first and said second guide means being contiguous with one edge of said supply conveyor and in inclined relation to the same, a first deflector extending obliquely downstream with respect to said supply and transfer conveyors to direct articles off said supply conveyor and onto said transfer conveyor, a second deflector extending obliquely downstream of said transfer conveyor across said horizontal portion toward said accumulator conveyor to direct articles off the former and onto the latter, a guide wall mounted along one edge of said accumulator conveyor, a third deflector downstream of said accumulator conveyor from said second deflector and extending obliquely upstream and inwardly from adjacent one edge of said accumulator conveyor for guiding articles off the same, and an elongate fence extending longitudinally upstream over said accumulator conveyor from adjacent the inner end of said third deflector and at a distance from said guide wall to retain a plurality of articles in single file relation longitudinally of said accumulator conveyor between said fence and said wall and in alignment with said third deflector whereby articles advanced on said accumulator conveyor between said fence and said wall will engage said third deflector and be guided thereby off the accumulator conveyor.

8. Article handling apparatus according to claim 7 and including an article diverter extending obliquely downstream from adjacent one edge of said accumulator conveyor to a point spaced longitudinally of the same from the upstream end of said fence to permit movement of an article between the adjacent ends of the diverter and the fence.

9. In an article accumulator including a conveyor adapted to move articles in a closed path and means for supplying articles to the conveyor, a discharge apparatus comprising a deflector extending obliquely inwardly and upstream from adjacent one edge of the conveyor to guide articles off the same, an elongate fence extending upstream of the conveyor from adjacent the inner end of said deflector and at a distance from said one edge to retain a plurality of articles in single file relation on said conveyor between said fence and said one edge and in alignment with said deflector, and a diverter extending obliquely inwardly and downstream over the conveyor from said one edge and having an inner end disposed at a point spaced from the upstream end of said fence providing an entry opening permitting movement of an article between the adjacent ends of the diverter and the fence, said inner end of the diverter being spaced further from said conveyor edge than said fence so that articles will be circulated along said closed path unless selectively drawn into said entry opening and are advanced on said conveyor between said fence and said one edge to engage said deflector and be guided thereby off the conveyor during advancement of the articles.

10. Apparatus for feeding articles to a processing unit capable of handling articles at a predetermined rate, an accumulator unit arranged to carry articles in an endless path, a plurality of feed conveyors arranged to deliver articles to said accumulator unit, means for actuating each feed conveyor at a speed such that each conveyor delivers articles at a rate less than said predetermined rate to said accumulator, a plurality of discharge conveyors arranged to deliver articles to the processing unit and positioned to receive articles from said accumulator unit, means overlying said accumulator unit for guiding articles onto said discharge conveyors, and means for driving each discharge conveyor at a speed such that the conveyor delivers articles at said predetermined rate to said processing unit.

(References on following page)

References Cited in the file of this patent

UNITED STATES PATENTS

| | | | |
|---|---|---|---|
| 550,744 | Challman | Dec. 3, | 1895 |
| 1,423,096 | Ferguson | July 18, | 1922 |
| 1,472,679 | Roddy | Oct. 30, | 1923 |
| 1,822,111 | Richardson et al. | Sept. 8, | 1931 |
| 1,921,577 | Nelson | Aug. 3, | 1933 |
| 2,741,379 | Stryker | Apr. 10, | 1956 |
| 2,833,393 | Kay | May 6, | 1958 |
| 2,944,688 | Jeremiah | July 12, | 1960 |

FOREIGN PATENTS

| | | | |
|---|---|---|---|
| 708,914 | Great Britain | May 12, | 1954 |